(12) United States Patent
Freeman et al.

(10) Patent No.: US 9,765,753 B2
(45) Date of Patent: Sep. 19, 2017

(54) IMPULSE TURBINE FOR USE IN BI-DIRECTIONAL FLOWS

(71) Applicants: Christopher Freeman, Cranfield (GB); Steven James Herring, Cranfield (GB); Kevin Banks, Cranfield (GB)

(72) Inventors: Christopher Freeman, Cranfield (GB); Steven James Herring, Cranfield (GB); Kevin Banks, Cranfield (GB)

(73) Assignee: Dresser-Rand Company, Olean, NY (US)

( * ) Notice: Subject to any disclaimer, the term of this patent is extended or adjusted under 35 U.S.C. 154(b) by 513 days.

(21) Appl. No.: 14/070,855

(22) Filed: Nov. 4, 2013

(65) Prior Publication Data
US 2014/0056691 A1 Feb. 27, 2014

(51) Int. Cl.
*F03B 13/24* (2006.01)
*F01D 1/02* (2006.01)
(Continued)

(52) U.S. Cl.
CPC .............. *F03B 13/24* (2013.01); *F01D 1/02* (2013.01); *F01D 5/141* (2013.01); *F01D 5/143* (2013.01);
(Continued)

(58) Field of Classification Search
CPC . F01D 1/0204; F01D 1/12; F01D 1/30; F01D 9/00; F01D 5/143; F01D 5/145;
(Continued)

(56) References Cited

U.S. PATENT DOCUMENTS 2,944,729 A 7/1960 Foley et al.
3,464,357 A * 9/1969 Gilbert .................. B63H 25/46
114/151
(Continued)

FOREIGN PATENT DOCUMENTS

FR 473822 A 1/1915
GB 1449740 A 9/1976
(Continued)

OTHER PUBLICATIONS

Australian Patent Application No. 2007279098—Examiner's first report, dated Sep. 27, 2011, 3 pages.
(Continued)

*Primary Examiner* — Craig Kim
*Assistant Examiner* — Juan G Flores (57) ABSTRACT

A turbine arrangement for a bi-directional reversing flow is provided. The turbine arrangement may include a rotor rotatably mounted to rotate about an axis of the turbine arrangement, and the rotor may have a plurality of rotor blades disposed circumferentially thereabout. A first set of guide vanes may be circumferentially disposed about the axis for directing the bi-directional reversing flow to and from the rotor blades via a first flow passaged defined by a first duct. A second set of guide vanes may be axially spaced from the first set of guide vanes and circumferentially disposed about the axis for directing the bi-directional reversing flow to and from the rotor blades via a second flow passage defined by a second duct. The guide vanes may be disposed at a greater radius than the rotor blades, such that the guide vanes are radially offset from the rotor blades.

3 Claims, 9 Drawing Sheets

(51) Int. Cl.
*F01D 5/14* (2006.01)
*F03B 13/14* (2006.01)
*F01D 9/00* (2006.01)

(52) U.S. Cl.
CPC ............... *F01D 5/145* (2013.01); *F01D 9/00* (2013.01); *F03B 13/142* (2013.01); *F05B 2210/404* (2013.01); *F05B 2240/241* (2013.01); *F05B 2250/33* (2013.01); *F05D 2210/44* (2013.01); *F05D 2240/122* (2013.01); *F05D 2240/241* (2013.01); *F05D 2240/304* (2013.01); *F05D 2250/33* (2013.01); *F05D 2270/17* (2013.01); *Y02E 10/32* (2013.01); *Y02E 10/38* (2013.01)

(58) Field of Classification Search
CPC .. F03B 13/142; F03B 13/24; F05B 2210/404; F05B 2240/241; F05B 2250/33; F05D 2210/44; F05D 2240/122; F05D 2240/241; F05D 2240/304; F05D 2250/33; F05D 2270/17; Y02E 10/32; Y02E 10/38
See application file for complete search history.

(56) References Cited

U.S. PATENT DOCUMENTS

| | | | |
|---|---|---|---|
| 3,572,960 A | 3/1971 | McBride | |
| 3,922,739 A | 12/1975 | Babintsev | |
| 4,009,396 A | 2/1977 | Mattera et al. | |
| 4,152,895 A | 5/1979 | Wirt | |
| 4,186,557 A | 2/1980 | Arai et al. | |
| 4,221,538 A | 9/1980 | Wells | |
| 4,286,347 A * | 9/1981 | Modisette | F03B 13/142 290/42 |
| 4,385,492 A | 5/1983 | Lee | |
| 4,441,316 A | 4/1984 | Moody | |
| 4,545,726 A | 10/1985 | Holliger | |
| 5,005,357 A | 4/1991 | Fox | |
| 5,125,794 A | 6/1992 | Detanne | |
| 6,216,455 B1 | 4/2001 | Doleh et al. | |
| 6,360,534 B1 | 3/2002 | Denniss | |
| 6,851,264 B2 | 2/2005 | Kirtley et al. | |
| 7,928,594 B2 | 4/2011 | Shreider et al. | |
| 8,084,873 B2 | 12/2011 | Carter et al. | |
| 8,596,955 B2 * | 12/2013 | Freeman | F01D 1/02 415/3.1 |
| 8,698,331 B2 | 4/2014 | Carter | |
| 8,723,352 B2 | 5/2014 | Reddy | |
| 8,826,425 B2 | 9/2014 | Pfitzmann et al. | |
| 8,916,986 B2 | 12/2014 | Littlewood | |
| 9,132,922 B2 | 9/2015 | Justak | |
| 2010/0209236 A1 | 8/2010 | Freeman et al. | |
| 2011/0101696 A1 | 5/2011 | Holle et al. | |

FOREIGN PATENT DOCUMENTS

| | | |
|---|---|---|
| GB | 1500400 A | 2/1978 |
| GB | 2099929 A | 12/1982 |
| JP | 5859301 A | 4/1983 |
| JP | 09195705 A | 7/1997 |
| JP | 200697633 A | 4/2006 |
| JP | 2007170298 A | 7/2007 |
| JP | 2011074854 A | 4/2011 |
| SU | 1328577 A1 | 8/1987 |
| WO | 2006137696 A1 | 12/2006 |
| WO | 2008012530 A3 | 1/2008 |

OTHER PUBLICATIONS

Canadian Application No. 2,658,914—Examiner's Report, dated May 22, 2012, 3 pages.
Application No. GB0614916.5—Patents Act 1977: Examination Report under Section 18(3), dated Jul. 21, 2010, 3 pages.
Setoguchi, T., Santhakumar, S., Maeda, H., Takao, M., Kaneko, K., "A review of impulse turbines for wave energy conversion", Renewable Energy vol. 23, No. 2, Jun. 2001, pp. 261-292.
New Zealand Patent Application No. 574760—Examination Report, dated May 10, 2011, 2 pages.
Norwegian Patent Application No. 20090881—Search Report, dated Jan. 23, 2016, 2 pages.

* cited by examiner

TWIST

LEAN

SWEEP

IMPULSE TURBINE FOR USE IN BI-DIRECTIONAL FLOWS

CROSS REFERENCE TO RELATED APPLICATIONS

This application is a continuation of U.S. application having Ser. No. 12/374,925, filed on Apr. 13, 2010, which is a U.S. national phase application of international patent application number PCT/GB2007/002827, filed Jul. 25, 2007, which claims priority to GB patent application number 0614916.5, filed Jul. 26, 2006, the disclosures of which are incorporated herein by reference to the extent consistent with the present application.

The present invention relates to a turbomachine arrangement which can operate with bi-directional flows, and in particular to an impulse type turbine arrangement for use with a bi-directional flow. More specifically, and preferably, it relates to such a turbine arrangement for use in an oscillating water column power plant to generate electricity from wave power. The turbine arrangement may though have other applications in the renewable energy generation field, or even more generally in other turbomachine applications.

Electrical generators that harness the power of an oscillating water column have been known for at least a number of decades. In general, these generators include a large chamber that includes a first opening submerged below water level and a second opening that vents to the atmosphere via a turbine. As the crests and troughs of waves arrive at the chamber, the level of the water column within the chamber periodically rises and falls, thereby alternately forcing air within the chamber to vent through the turbine into the atmosphere and drawing air from the atmosphere back through the turbine to the chamber. A particular problem with such generators is that they require turbine arrangements that can operate and generate electricity from the reversing bi-directional airflow pumped by the oscillating water column through the turbine arrangement.

One type of turbine arrangement which may be used in such an oscillating water column generator is an impulse turbine. The basic principle of operation of an impulse turbine is that the flow from which energy is to be extracted first passes through a row of nozzles which are used to accelerate the flow into the rotor at an appropriate angle, the rotor then extracts kinetic energy from the accelerated flow. An important feature of an impulse turbine or machine is that there is substantially no change of static pressure across the rotor (in a reaction type turbine the static pressure decreases as the fluid passes through the rotor stage). When the flow through the impulse turbine is uni-directional (which is the conventional situation), the turbine stage will consist of a nozzle row, followed by a rotor row. However, if it is desired to utilise an impulse turbine in an application where the flow direction through the turbine periodically reverses, for example in an oscillating water column electricity generating unit, then a row of nozzles is needed on each side of the rotor to create the correct rotor entry conditions in both flow directions. Examples of such arrangements, in particular used in an oscillating water column electricity generating unit are described in GB 1449740 and GB 1500400.

A problem with these arrangements is that if the nozzle geometry is fixed, then the blades on the downstream side of the rotor are not correctly aligned to accept the rotor exit flow. Typically the resultant rotor exit flow is axial, with no circumferential swirl flow or component to give no pressure drop across the rotor and good rotor efficiency. The nozzle guide vanes adjacent the rotor are though at angle to the axial direction to direct the opposite flow correctly at an angle onto the rotor. The magnitude of the flow misalignment angle for the respective reverse flow may be large, which leads to a large pressure loss through the downstream nozzles, and a similarly large reduction in the overall efficiency of the turbine. The level of peak steady flow efficiency typically associated with fixed geometry impulse turbine arrangements for use in oscillating water column power plants is less than 40%.

This problem could be overcome if the nozzle guide vanes are either designed so that the angular setting of the vanes, or the actual geometry of the vanes themselves, changes with flow direction. The practical realisation of such solutions, however, typically leads to the need for complicated mechanical arrangements to achieve the geometric variations required. This, in turn, gives rise to significant reliability and maintenance problems when the arrangement is called upon to function for a large number of cycles and/or is used in a marine environment. Peak efficiencies of more than 60% have though been obtained for such variable geometry turbine types, but these have been associated with significant maintenance and reliability issues, and so have not been adopted for use.

Accordingly developments of oscillating water column electricity generating units have not favoured the use of impulse type turbine arrangements. Indeed, and despite some of the advantages of impulse turbines they are not widely used or favoured generally and for hydraulic applications and are only used in specialist applications, with in general reaction turbine arrangements being favoured. In particular developments of oscillating water column electricity generating units have concentrated on using Wells type turbines which are self rectifying and can operate and generate electricity from the reversing bi-directional airflow. In theory such turbines can operate at high efficiencies of over 50% under steady state flow conditions which have shown peak steady flow efficiencies with fixed geometry. However such turbines only operate efficiently over a relatively small mass flow range and so can only efficiently operate over a relatively small range of wave conditions. In addition Wells turbines generally operate at a relatively high rotational speed and low torque (as compared for example to an impulse turbine) and have relatively high axial loads all of which is undesirable for use in an oscillating water column electricity generating unit.

It is therefore desirable to provide an alternative approach, and provide an improved impulse turbine arrangement that can operate from the reversing bi-directional flow, as for example pumped by the oscillating water column, and which provides a solution to the above problem of low overall efficiency when the flow through an impulse turbine periodically reverses. It is also desirable to provide an improved oscillating water column electricity generating unit incorporating and using an improved turbine. The invention may also be more generally applicable, and it is more generally desirable to provide an improved and/or alternative turbomachine arrangement that can operate with a reversing bi-directional flow.

According to the present invention there is therefore provided a bi-directional flow impulse type turbine arrangement as variously described in the accompanying claims. There is also provided an oscillating water column power generator including such a bi-directional flow impulse type turbine arrangement as further described in the accompanying claims.

In an embodiment of a first aspect of the invention there is provided a bi-directional flow impulse type turbine arrangement for use with a bi-directional reversing flow through the turbine arrangement. The turbine arrangement has an axis and comprises a rotor, and first and second sets of guide vanes circumferentially disposed about the axis and located on an opposite axial side of the rotor for directing the bi-directional reversing flow to and from the rotor blades. The rotor is rotatably mounted to rotate about the axis and has a plurality of rotor blades disposed circumferentially around the rotor. The guide vanes are disposed at a greater radius than the rotor blades such that they are radially offset from the rotor blades and the turbine arrangement further comprises first and second annular ducts disposed respectively between the first and second sets of guide vanes and the rotor for directing fluid from the guide vanes to the rotor blades.

In such an arrangement the velocity of the flow from the rotor decreases before it reaches the downstream guide vanes, such that losses associated with the downstream rotor flow over the downstream guide vanes are reduced.

The height of the annular flow passage of the first and second annular ducts may be constant along the length of the annular ducts. Alternatively the height of the annular flow passage of the first and second annular ducts may vary and in particular reduce at an end of the duct adjacent the rotor blades. Such a variation in the duct height will advantageously vary the angle of the flow to and from the guide vanes that is then directed to the rotor blades so reducing the required turning angles of the rotor and/or guide vanes. This may then reduce the losses associated with the downstream flow from the rotor over the guide vanes during a reverse flow over the guide vanes.

In an embodiment of a second aspect of the invention there is provided a bi-directional flow impulse type turbine arrangement for use with a bi-directional reversing flow through the turbine arrangement. The turbine arrangement has an axis and comprises a rotor, and first and second sets of guide vanes circumferentially disposed about the axis and located on an opposite axial side of the rotor for directing the bi-directional reversing flow to and from the rotor blades. The rotor is rotatably mounted to rotate about the axis and has a plurality of rotor blades disposed circumferentially around the rotor. At least one boundary layer flow control outlet is defined in a guide vane surface of the guide vanes of at least one of the sets of guide vanes. The boundary layer flow control outlet is connected to a fluid source to, in use, direct fluid from the fluid source to the outlet and over the guide vane surface.

Such a boundary layer flow control outlet and directing fluid from the fluid source to the outlet and over the guide vane surface re-energises the flow over the guide vane reducing separation of the flow and so the associated pressure losses thereby improving efficiency of the turbine arrangement.

In an embodiment of a third aspect of the invention there is provided a bi-directional flow impulse type turbine arrangement for use with a bi-directional reversing flow through the turbine arrangement. The turbine arrangement has an axis and comprises a rotor, and first and second sets of guide vanes circumferentially disposed about the axis and located on an opposite axial side of the rotor for directing the bi-directional reversing flow to and from the rotor blades. The rotor is rotatably mounted to rotate about the axis and has a plurality of rotor blades disposed circumferentially around the rotor. The guide vanes have a cross sectional profile comprising a first portion oriented generally parallel to the axis and an axial flow through the turbine, a second portion oriented at an angle to the axis and axial flow through the turbine, and a turning portion disposed between the first and second portions. A flow passage is defined between adjacent guide vanes, and the cross sectional area of the flow passage defined between the turning sections of adjacent guide vanes is substantially constant. In particular to achieve this the guide vanes are defined by a wall and between the turning sections of adjacent guide vanes the distance between the walls of adjacent guide vanes is substantially constant.

Such an arrangement reduces the flow losses associated with a reverse flow over the guide vane thereby improving the efficiency of the turbine arrangement.

The turning section of the vanes preferably have a camber line which is defined by a circular arc, and the circular arc extends over a predetermined turning angle of the vane.

Preferably the end of the second portion has a radiused edge having a radius of between 2 and 10%, and more preferably of 4.5% of the axial chord of the vane. This further reduces flow losses associated with a reverse flow over the guide vane thereby further improving the efficiency of the turbine arrangement.

In an embodiment of a fourth aspect of the invention there is provided a bi-directional flow impulse type turbine arrangement for use with a bi-directional reversing flow through the turbine arrangement. The turbine arrangement has an axis and comprises a rotor, and first and second sets of guide vanes circumferentially disposed about the axis and located on an opposite axial side of the rotor for directing the bi-directional reversing flow to and from the rotor blades. The rotor is rotatably mounted to rotate about the axis and has a plurality of rotor blades disposed circumferentially around the rotor. The rotor blades have a turning angle which is 3 to 5 degrees greater than required for a rotor blade to produce an axial flow at the operating point of the turbine. Moreover the rotor blade has a turning angle so as to produce in use a non axial outlet flow from the rotor.

Such a turning angle for the rotor blades is un conventional, but reduces the angle of incidence on the downstream guide vane so reducing the losses associated with a reverse flow over the guide vane thereby improving the efficiency of the turbine arrangement.

Preferably the turning angle of the rotor blades is between 70 and 140 degrees.

The rotor blade is preferably symmetrical about a plane perpendicular to the axis and passing through an axial mid point of the blade.

In a yet further aspect of the invention there is provided an oscillating water column power generator including such a turbine arrangement as described above. The oscillating water column power generator comprises a housing defining a chamber for a fluid which is periodically compressed and expanded by the oscillating water column. The housing has an outlet for directing a bi-directional reversing flow of the fluid periodically compressed and expanded by the oscillating water column from the housing. The turbine arrangement is connected to the outlet and driven by the bi-directional reversing flow of the fluid from the outlet. A generator is connected to and driven by the rotor of the turbine arrangement.

Such an oscillating water column power generator with such a turbine arrangement is more efficient than conventional arrangements, using other turbine arrangements.

In general terms the novel impulse turbine arrangement described herein incorporates the following features and aspects which may be used separately, or more preferably in combination in particular within an oscillating water column electricity generating unit, or more generally in any turbo machine which is required to operate with a reversing bi-directional flow. These main aspects of the arrangement are:

A) Annular offset ducts which are used to set the guide vanes at a greater radius from the axis of rotation than the rotor blades;

B) A nozzle/guide vane design which is tailored for operation in periodically reversing flows;

C) The use of an arrangement to introduce fluid through the nozzle/guide vane surface to re-energise the boundary layer through boundary layer blowing;

D) The use of a rotor blade design with an unconventionally high turning angle of up to 70 degrees for example on the rotor blades to obtain the peak efficiency at a final design mass flow ratio condition of 1.0 typically. (Note: mass flow ratio is defined as the ratio between average axial velocity entering the turbine and the rotor speed at mid-span, and given the symbol ϕ.)

The present invention will now be described by way of example only with reference to the following figures in which.

Figure 1:
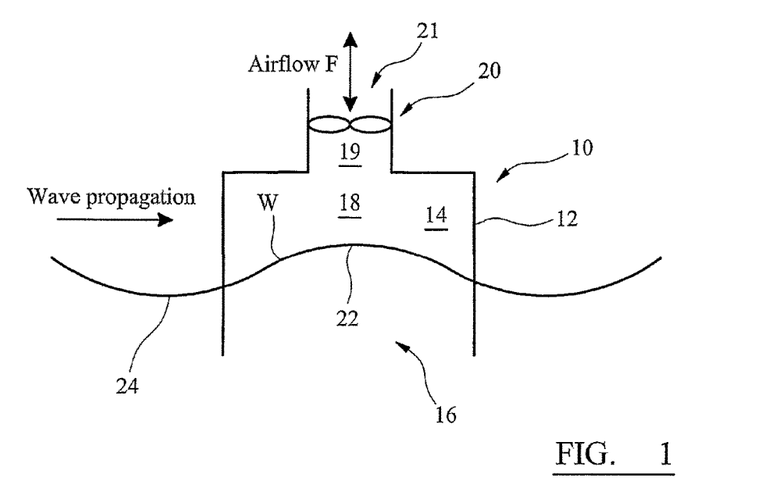
FIG. 1 is a schematic illustration of an oscillating water column electricity generating unit.

Referring to FIG. 1 an oscillating water column electrical generator 10 comprises an inverted container housing 12 that defines a large, typically cylindrical, chamber 14 that includes a first opening 16 submerged below water level W and a second opening 18 that vents to the atmosphere via an air duct 19, a turbine assembly 20 mounted within the air duct 19, and an outlet 21. As the crests 22 and troughs 24 of waves arrive at the chamber 14, the level W of the water column within the chamber 14 periodically rises and falls, thereby alternately forcing air within the chamber 14 to vent via the second opening 18 through the turbine assembly 20 to the atmosphere and drawing air from the atmosphere back through the turbine assembly 20 into the chamber 14. This bi-directional flow F through the turbine assembly 20 drives and rotates a rotor of the turbine assembly which is connected via a shaft to an electrical generator to generate electrical power.

Figure 2:
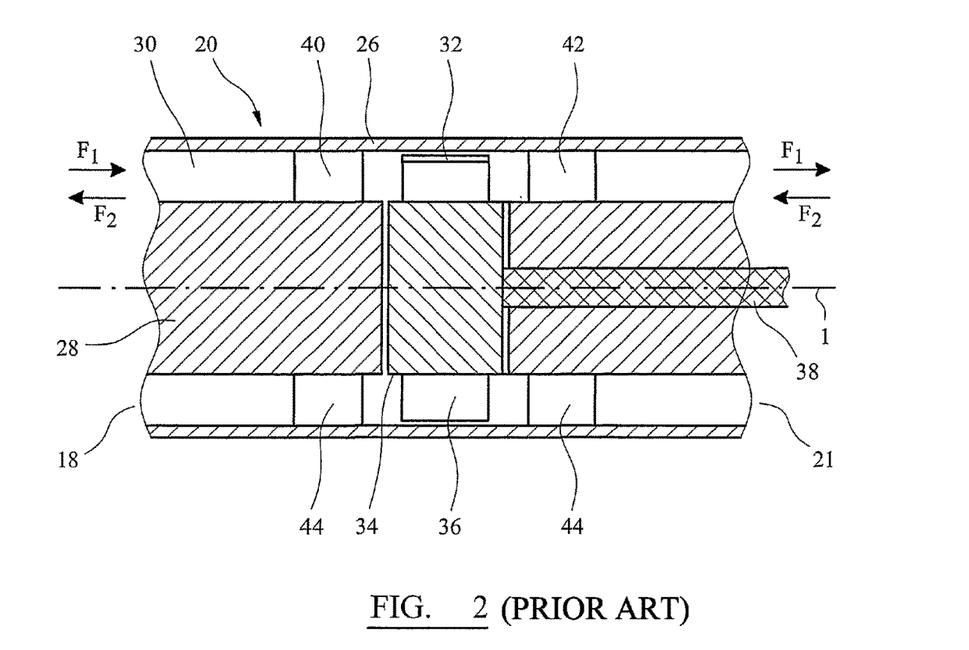
FIG. 2 is a more detailed view, with half the casing removed to reveal the blade rows, of a conventional impulse turbine arrangement for use with the oscillating water column electricity generating unit and having fixed guide vanes for use in the periodically reversing flows.

FIG. 2 shows a conventional impulse type turbine assembly 20 which may be used in such an oscillating water column electrical generator 10. The turbine assembly 20 comprises an outer cylindrical housing 26, and a cylindrical centre body 28 mounted concentrically about a central axis 1 of the turbine assembly 20 and within the housing 26 defining an annular duct 30 therebetween. The annular duct 30 is connected at one end to the first opening 18 of the oscillating water column electrical generator 10, and at the other to the outlet 21 of the oscillating water column electrical generator 10 to direct the bi-directional flow F,F1,F2 through the turbine assembly 20. An impulse turbine rotor assembly 32, comprising a central hub 34 and a plurality of rotor blades 36 circumferentially spaced and mounted around the circumference of the hub 34, is rotatably mounted within the outer cylindrical housing 26. The hub 34 is connected and mounted on a shaft 38 connecting the rotor assembly 32 to the electrical generator. The outer periphery of the hub 34 is aligned with the centre body 28 to continue the annular duct 30 with the rotor blades 36 disposed within and aligned with the annular duct 30. A first set of nozzle guide vanes 40 forming a stator assembly are mounted and circumferentially disposed within the annular duct 30 on one axial side of the rotor assembly 32 for accelerating and directing the air flowing in a first direction F1 from the chamber 14 onto the blades 36 of the rotor assembly 32. Similarly a second set of nozzle guide vanes 42 forming a stator assembly are mounted and circumferentially disposed within the annular duct 30 on the other opposite axial side of the rotor assembly 32 for accelerating and directing the air flowing in a second direction F2 from the outlet 21 onto the blades 36 of the rotor assembly 32. The vanes 44 of the first and second sets of nozzle guide vanes 40,42 are preferably oriented and angled so as to direct the respective bi-directional air flow F,F1,F2 on to the rotor blades 36 so as to rotate the rotor assembly 32 in the same direction regardless of the direction of the air flow F,F1,F2.

The vanes 44 may conventionally comprise simple bent plates to turn the air flow, impart a circumferential swirl component on the air flow F,F1,F2 and provide a flow restriction to accelerate the air flow F,F1,F2. Alternatively the vanes 44 may have a more refined aerofoil profile. The nozzle guide vanes 40,42, and rotor blades 36, and annular duct 30 are all axially aligned and at the same radius from the central axis 1 so as to provide a generally axial flow path which is parallel to the central axis 1 of the turbine assembly 20.

Such an impulse turbine assembly is conventional and is similar to that described, for example, in GB 1449740. As mentioned previously such a turbine arrangement 20 suffers from poor efficiency. This is principally because the nozzles guide vanes 40 which are required and angled to operate as inlet guide vanes to direct the flow of air in the first direction F1 onto the rotor 32 are not correctly aligned to accept the flow of air F2 from the rotor 32 when the air flows in the second opposite direction F2, and the guide vanes become outlet guide vanes. As a result a large pressure loss is generated downstream of the rotor 32 resulting in poor overall efficiency.

Figure 3:
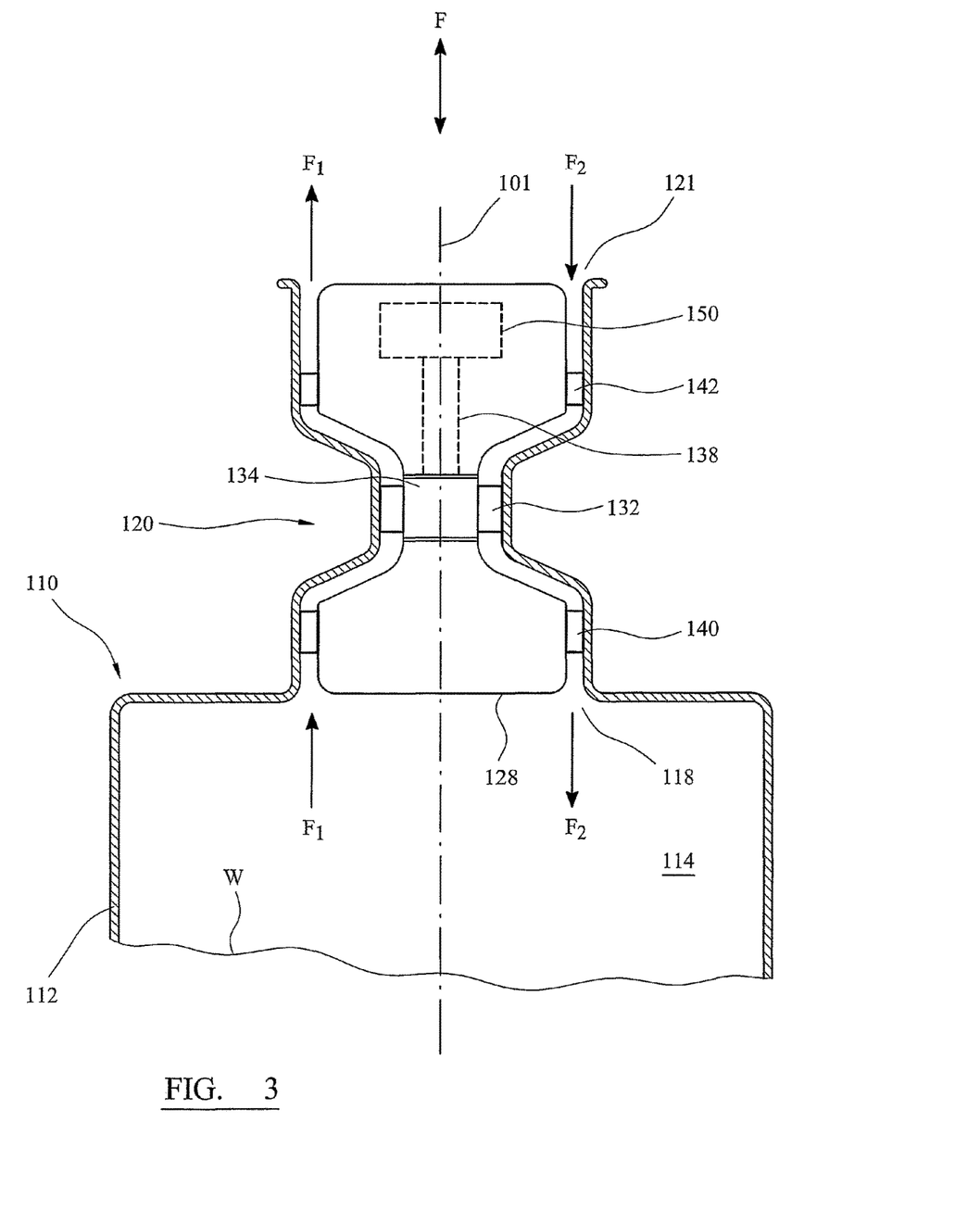
FIG. 3 is a schematic illustration of an oscillating water column electricity generating unit including an impulse turbine arrangement in accordance with an embodiments of the present invention.
Figure 4:
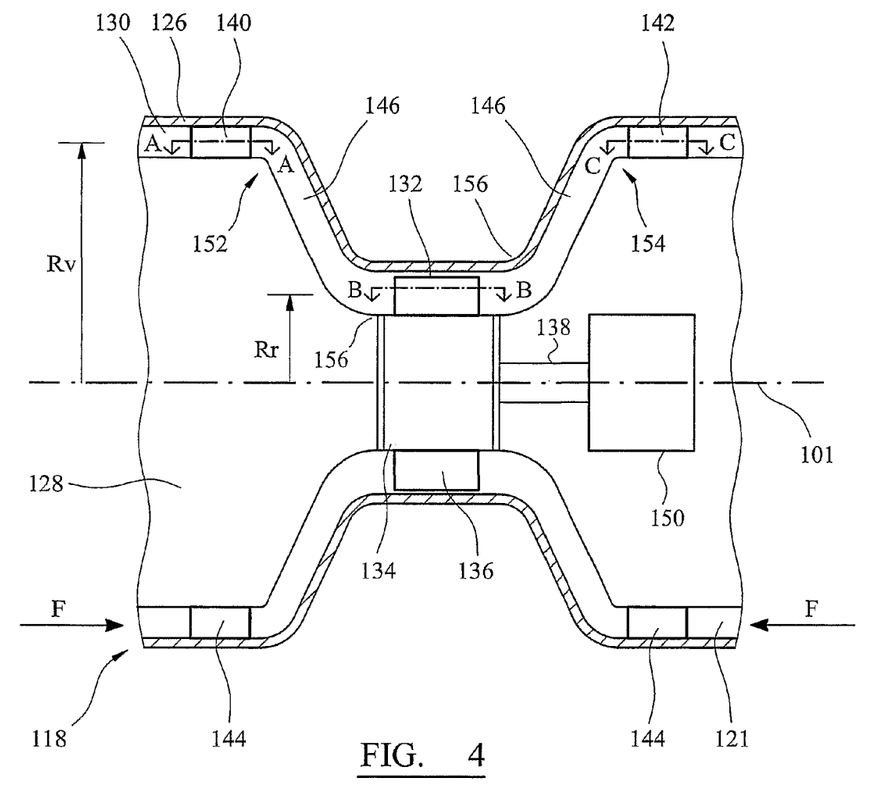
FIG. 4 is a more detailed view, with half the casing removed to reveal the blade rows, of the impulse turbine arrangement with fixed guide vanes and incorporating annular offset vaneless ducts for use in the oscillating water column electricity generating unit shown in FIG. 3.

FIGS. 3 and 4 illustrate an oscillating water column electrical generator 110 and improved turbine assembly 120 of an embodiment of the invention. The oscillating water column electrical generator 110 and turbine assembly 120 is generally similar to that shown in FIGS. 1 and 2 and described above. Only the main differences will therefore be described in detail, and like reference numerals but incremented by 100 will be used for like corresponding features. FIGS. 3 and 4 also show the electrical generator 150 not shown in FIGS. 1 and 2.

As shown in FIGS. 3 and 4, the first and second sets of nozzle guide vanes 140,142 are placed at a larger radius Rv than the rotor blades 136. Specifically the centre point or mid-span/mid-height of the rotor blades 36 are at a radius Rr, and the centre point or mid-span of the nozzle guide vanes 144 is at a radius Rv from the central axis 1. In this embodiment the first and second sets of nozzle guide vanes 140,142 are both disposed at the same radial distance Rv from the central axis. Serpentine curved annular offset ducts 146 connect between the sets of nozzle guide vanes 140,142 and rotor blades 136 to direct the air flow F,F1,F2 to and from the guide vanes 144 and rotor blades 136. In this embodiment the flow passage height Hd of the annular offset ducts 146 (perpendicular to the duct walls) remains generally constant and is equal to the rotor blade and nozzle guide vane 144 radial height Hr, Hv. As a result of the change in radius of the overall cross sectional area of the annular flow passage (perpendicular to the axial direction and/or flow direction) reduces from the nozzle guide vane 140,142 end 152,154 of the annular offset ducts 146 to the rotor end 156 of the annular offset ducts 146. This means that in use after passing through the nozzle guide vanes 144 and as the flow F,F1,F2 is directed radially inwards towards the rotor blades 136 it is accelerated and both its axial and swirl velocity is increased. After the flow F,F1,F2 has passed through the rotor 132 it is directed by the annular offset duct 146 radially outwardly through and increasing annular flow area and passage as the radius increases, and is diffused and deswirled before reaching the downstream guide vanes. The axial and circumferential swirl velocity of the flow F,F1,F2 is accordingly reduced. This means that relatively slow moving fluid is directed at the nozzle guide vanes 142 which reduces the magnitude of the pressure losses (which are proportional to the velocity squared) which would otherwise occur, and so the efficiency is increased. The increase in efficiency obtained increases as the difference Ro in radius Rv, Rr at which the nozzle guide vane blades 144 and rotor blades 136 are placed increases, until the benefit is outweighed by the increase in frictional flow losses within the annular offset ducts 146.

Figure 6:
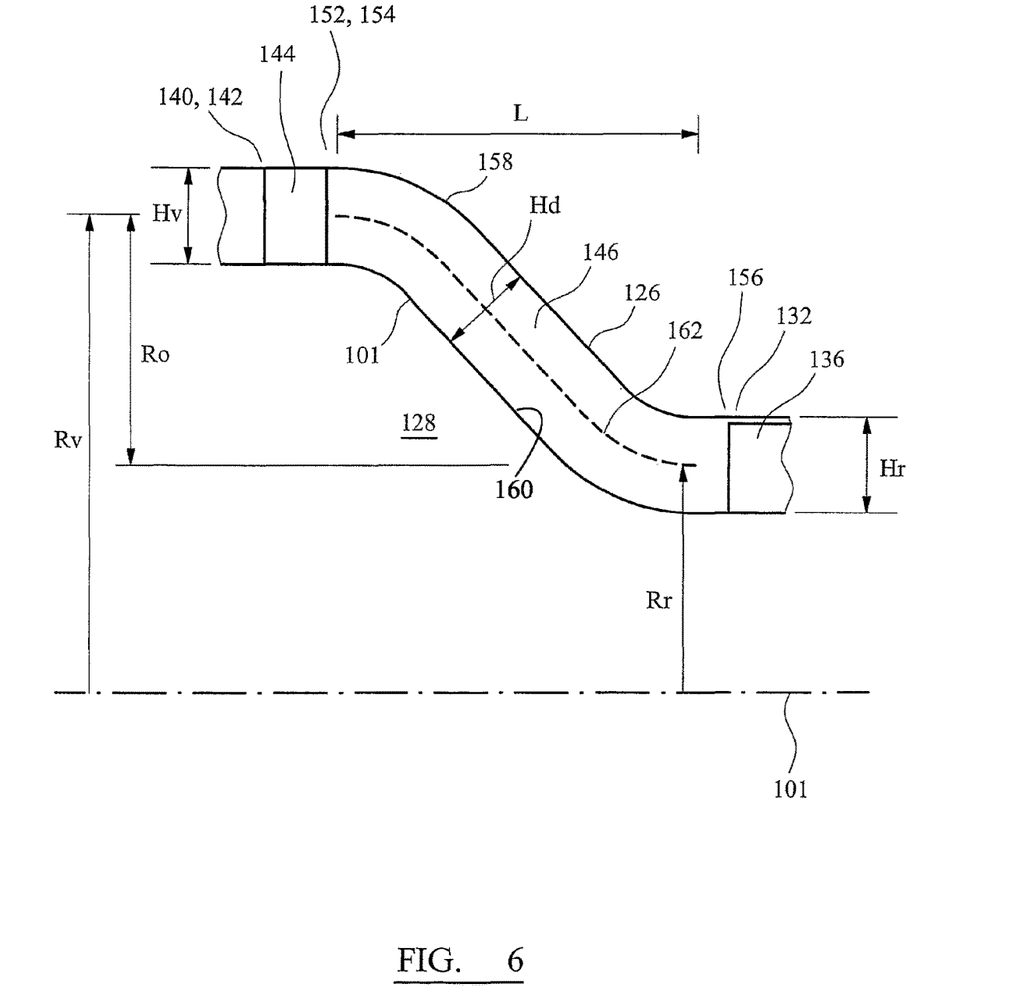
FIG. 6 is a more detailed schematic illustration of the annular offset vaneless duct of the impulse turbine arrangement shown in FIG. 4.

Part of one of the annular offset duct 146 is shown in more detail in FIG. 6. The annular offset duct 146 are defined by a curved wall 158 of the turbine assembly 120 and an outer peripheral wall 160 of the inner centre body 128 defining an annular duct 146 and flow passage therebetween. A flow passage centerline 162 of the annular offset ducts 146 is defined by a cosine function which is then scaled by defining the length L and required radial offset Ro of the duct 146 in terms of rotor blade radial height Hr. With the centerline defined, the perpendicular distance between the duct walls 158,160 in this embodiment preferably remains constant along the duct 146 length, and is equal to the height Hd of the flow annulus at the rotor 132 and nozzle guide vanes 140,142. The height Hd of the flow annulus is the same for both the first set of nozzle guide vanes 140, rotor blades 132, and second set of nozzle guide vanes 142.

The performance benefit which arises from incorporating and using the annular offset ducts 146 between the rotor 132 and the nozzle guide vanes 140,142, is proportional to the amount of diffusion which can be achieved whilst maintaining attached flow (avoiding flow separation as the flow diffuses) and minimising wetted surface area. In practice, these restrictions are likely to result in maximum flow passage area ratios being such that the flow passage area of the duct 146 at the guide vane end 152,154 is up to 4, more particular up to 3.5, and more preferably of up to 2.5 times the flow passage area of the duct 146 at the at the rotor end 156. This equates to a similar change in radius Rv,Rr, for constant height Hd duct 146, such that the radius of the vane mid span is up to 4, more particular up to 3.5, and more preferably of up to 2.5 times the mid span radius of the rotor Rr. This also equates and gives a typical offset distance Ro, and difference in the radii Rr,Rv of the mid-span points of the rotor blades 136 and nozzle guide vanes 144 of up to 10 or 12, and more preferably 6 times the rotor blade heights Hr, for rotor blades 136 with a typical hub to tip ratio and height.

The axial length L of offset duct 146 required to obtain a desired change in area ratio is determined from conventional diffuser design data. In general, diffuser losses reduce as the rate of expansion is decreased, until outweighed by the increase in wetted area. Ideally it is desirable to make the duct as short as possible whilst avoiding flow separation that can occur if the rate of expansion and duct 146 is too steep and too curved, and which would introduce flow losses. Therefore, in practice the length L is likely to be in the range of 4 to 12, and preferably 4 to 8 rotor blade heights Hr, depending upon the amount of diffusion sought. More specifically and preferably the diffusion, and change in area is achieved with a duct 146 whose length L in the axial direction was typically five rotor blade heights Hr.

Preferably the annular offset ducts 146 are, as shown, vaneless and are plain ducts 146 simply ducting the flow F,F1,F2 radially inwards/outward. However in certain applications where it is desirable to have a very compact arrangement in which the change in radius Ro is carried out in a very short axial length L it may be necessary to install flow control devices, such as vortex generators for example, in the duct 146 in order to prevent flow separations or highly non-uniform flows developing.

In this embodiment the offset ducts 146 on either side of the rotor 132 are symmetrical, and the sets of nozzle guide vanes 140,142 are at the same radius Rv. However in other embodiments the second set of nozzle guide vanes 142, and offset duct 146 leading to them may be at a different radius and dimensions since the flow F1 from the chamber 114 is denser than the flow F2 of air from the atmosphere into the chamber 114 such that the velocity of the flow of air F1 out from the turbine assembly and outlet 121 is less than the flow of air into the chamber 114. As a result the offset Ro and dimensions of the offset ducts 146 may be varied to take this into account.

The amount of blockage which the nozzle guide vanes 140,142 presents, and the losses which are thereby associated with it, are related, in a non-linear manner, to the amount of turning. This means that there is significant benefit in reducing the nozzle guide vane 144 turning angle. This may be achieved by making the height Hd of the offset ducts 146 less at the guide vane end 152,154, than at the rotor end 156. Specifically if the height Hd of the duct 146 is constant then for any change in radius Ro the axial velocity component and circumferential swirl velocity component of the flow F,F1,F2 change proportionately and the angle of the flow F,F1,F2 with respect to the axial direction at the nozzle guide vane end 152,154 and rotor end remains constant. However if the height of the duct Hd changes, the axial and circumferential components of the flow F,F1,F2 change differently and the angle of the flow F,F1,F2 to the axial direction can be varied to reduce the turning requirement. In particular if the duct height Hr, Hv, Hd is larger at the rotor end 156 than at the nozzle guide vane end 152,154 the flow angle can be advantageously varied so as to reduce the turning required by the nozzle guide vanes 144 and so the losses. However, this change in duct height Hd does reduce the change in flow passage area and so the diffusing effect and overall velocity variation, and may lead to a need to increase hub/tip ratio, both of which will tend to reduce performance. There is thus a balance to be struck, which will mean that the height Hd of the duct 146 at the nozzle guide vane end 152,154 is not likely to be less than half that at the rotor end 156. To compensate for the change in duct height Hd it will also be appreciated that the offset radius Ro and difference in the radius Rv,Rr of the vanes 140,142 to the rotor 132 could be varied to maintain the required change in overall flow passage area and diffusion.

Whilst moving the guide vanes 140,142 out to a greater radius Rv than the rotor blades 136 reduces the magnitude of the pressure loss, a large region of turbulent separated flow is still produced around the respective guide vanes 144 downstream of the rotor 132. This introduces pressure loss and reduces efficiency. The extent of this region of separated (i.e. turbulent) flow and the losses that it induces can be reduced by adopting a novel guide vane geometry that is adapted for operation in the reversing flows.

The design requirements for the guide vanes 144 are therefore for them to provide efficient flow turning with low loss when operating as inlet guide vanes in the forward flow direction to direct a flow of air onto the rotor blades 132, and to have characteristics which mitigate the impact of the flow separation that occurs when they operate in the reverse direction as outlet guide vanes. In particular the guide vane 144 profile should provide efficient turning in the forward flow direction, and have features which improve performance when operating in the reverse flow direction.

If a simple bent plate angled to direct flow at the rotor when operating upstream of the rotor, were to be used for the guide vanes 144 then the area of the flow passage between any adjacent two guide vanes decreases towards the rotor. When the flow reverses, however, and the guide vane is downstream of the rotor, and the passage between the bent plate guide vanes acts as a very poor diffuser, the losses increase. Therefore to improve the performance when operating in the reverse flow direction the guide vanes 144 are designed to have a profile in which the cross-sectional area of the portion of the passage between the vanes 144 in which the flow turning occurs is kept almost constant. This feature means that when the vanes 144 are operating in the reverse flow direction there is almost no diffusion taking place in the region where the flow is being turned—which would exacerbate the development of separated flow—the diffusion taking place in the portion of the passage where there is no flow turning.

In addition the length of turning section 166 of the vane is kept as short as possible to minimise the axial blockage to the rotor exit flow. The guide vanes 144 also have a relatively blunt radiused trailing edge which reduces the impact of the high flow incidence angle and changes in flow incidence. In contrast for a conventional unidirectional guide vane it is generally desirable for the trailing edge (nearer the rotor) to have as sharp a profile as possible, and for the trailing edge of the guide vane to be as thin as possible.

Figure 5A:
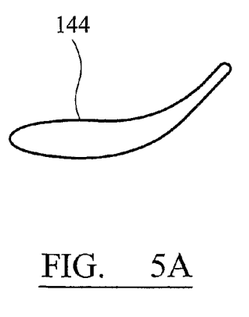
FIG. 5A to 5C are cross sectional views, on sections A-A, B-B and C-C respectively through the vanes and blades of the impulse turbine arrangement shown in FIG. 4.
Figure 5B:
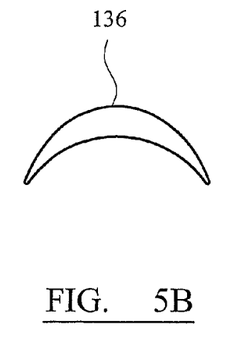
Figure 5C:
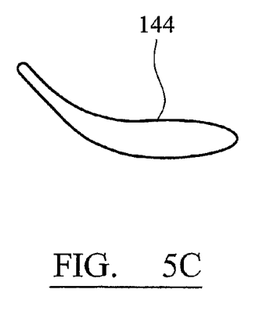
Figure 7:
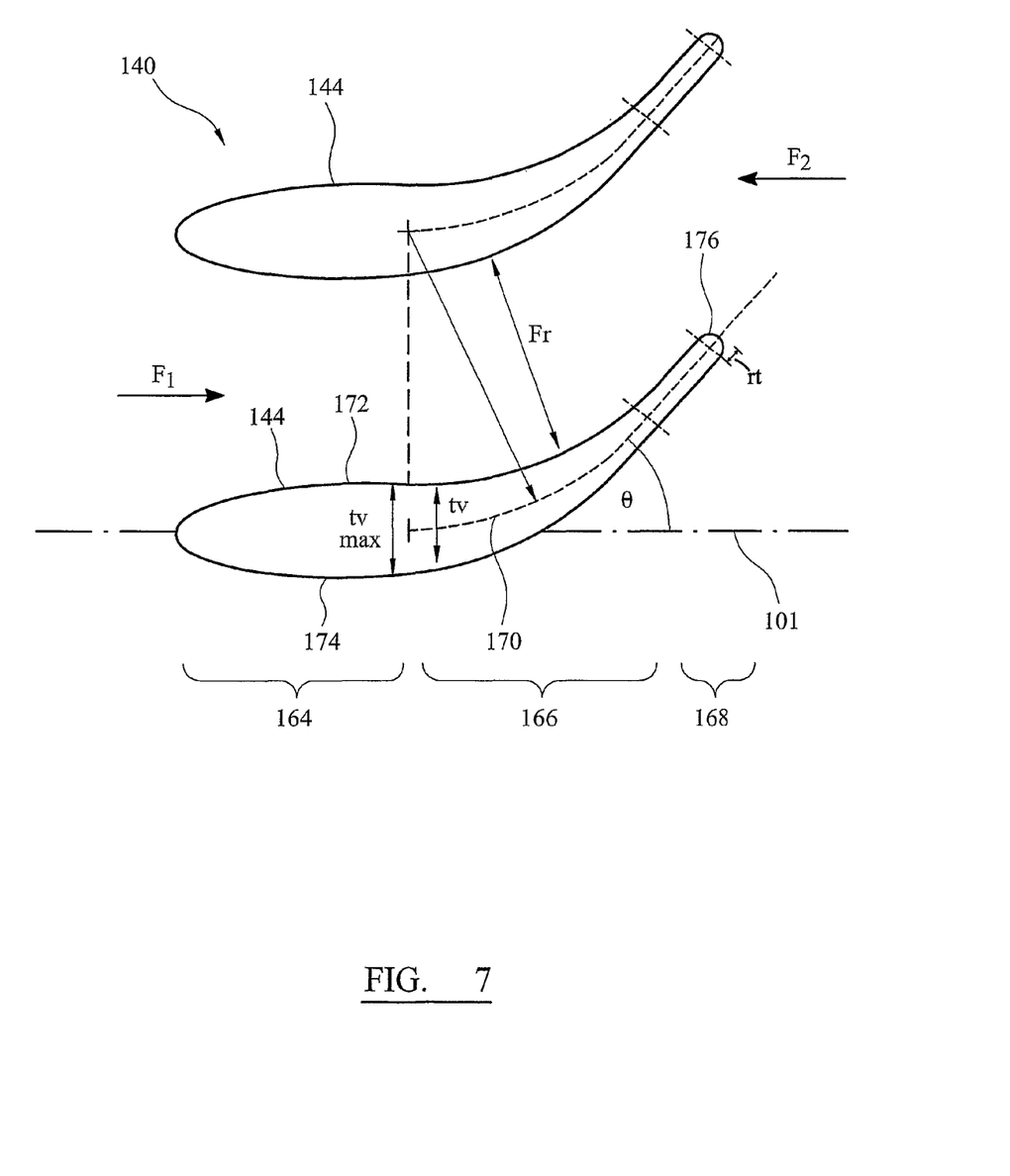
FIG. 7 is a more detailed schematic illustration of the guide vane profile and spacing of the guide vanes of the impulse turbine arrangement shown in FIG. 4.

A suitable guide vane profile to meet these objectives, as well as direct the flow of air onto the rotor blades is shown in FIGS. 5a, 5c and 7. FIG. 7 shows the vane profile of a vane 144 of the first set of nozzle guide vanes 140 in relation to the flow directions F,F1,F2. The vane profile of the vanes 144 of the second set of nozzle guide vanes 142 is the same but with the vane 144 orientated in the opposite axial direction as shown by comparing FIGS. 5a and 5c.

The nozzle guide vane 144 cross sectional profile comprises a nose section 164, a turning section 166, and a tail section 168. The nose section 164 is disposed axially furthest away from the rotor 132 and towards the opening 118 into the chamber 114 or outlet 121 depending upon which nozzle guide vane set the vane is used in. The tail section 168 is disposed axially towards the rotor 132, with the turning section 166 between the nose 164 and tail 168 sections. The profile of the nozzle guide vane blades 144 are formed by blending a number of geometrical features of each of these sections together.

The required profile, and turning section 166, is constructed by defining the amount of turning required as a circular arc 170 extending over the required turning angle θ to direct the air flow correctly at the rotor blades 136 when the flow (F1 in FIG. 7) is such that the guide vane 144 is upstream of the rotor blades 136. This circular arc 170 forms a centre camber line 170 of the vane 144, minimises the length of the turning section 166. Upper and lower surfaces 172,174 spaced from the camber line 170, and the thickness tv to chord ratio, is then defined over this turning section to keep the area Fp of the passage between consecutive nozzle guide vanes 144 over this turning section 166 virtually constant. The upper and lower surfaces 172,174 are kept continuously smooth by defining their profiles using suitable mathematical functions, cosine, cubic and/or tangent functions.

The tail section 168 comprises a short straight extension of the end of the turning section 166 with the upper and lower surface being generally parallel. The tail section 168 is preferably only up to 10% of the overall vane axial chord length, but may be up to 30% or even 50% of the overall vane axial chord length. The end of the tail section 168 is then completed by a relatively blunt radiused trailing edge 176 which reduces the impact of the high flow incidence angle and changes in flow incidence when the vane 144 is subject to the reverse flow (F2 in FIG. 7). This trailing edge 176 may be semi-circular with a radius it of between 2 and 10%, and more preferably of 4.5%, of the axial chord.

The nose section 164 of the vane profile is disposed with the camber line parallel to the central axis 101 and in the axial direction such that there is no turning of the flow over the nose section 164. The nose section 164 has a relatively a fine (i.e. relatively long) elliptical or other suitable profile which defines an increasing flow passage between adjacent vanes 144 so as to provide a gradual required diffusion for the reverse flow when the vane 144 is subject to the reverse flow (F2 in FIG. 7) and downstream of the rotor 132. The maximum thickness Tvmax of the vane 144 and the fineness ratio of the elliptical nose section 164 ahead of the point of maximum thickness are determined by the thickness of the trailing edge 176, turning section 166 and turning angle θ and the requirement to maintain a constant flow passage area Fp over the turning section 166.

The resultant vane 144 profile, as shown in FIG. 7, is relatively fat, and has a relatively large maximum thickness. This geometry also has the advantage that there is significant internal volume which may be utilised either to serve as a plenum chamber for air used for boundary layer blowing (described below), or to house actuator mechanisms associated with having a variable geometry blade.

In the preferred arrangement, as shown, the area of the flow passage is substantially constant over both the turning 166 and tail sections 168, with the area only varying, and increasing over the nose section. Accordingly diffusion of the flow F,F1,F2 only occurs over the nose section 164 of the vane 144.

In general, as flow through an impulse turbine is increased the efficiency increases until a peak is reached, after which there is a gentle decrease with further increases in flowrate. This means that to achieve high efficiency over a reversing cycle the turbine should run at a high mass flow rate condition—to minimise the time spent operating at low mass flow rate, low efficiency conditions. To meet the foregoing requirements the design objective thus becomes to have a relatively high mass flow ratio design point i.e. average axial velocity/rotational velocity at mid-span of $\phi=1.0$ for example, based upon blade geometries. This can be contrasted with conventional impulse type turbine arrangements and rotor designs, and turning angles α which have a design point mass flow ratio of $\phi=0.4$ for example.

In conventional installations an impulse turbine operates with greatest efficiency when the exit flow from the rotor is axial, and hence turbines are usually designed to approach this condition at their design point. When we have guide vanes 140,142 downstream of the rotor exit, as in the case of a reversing flow, and the rotor 132 exit flow is close to axial the flow incidence onto the guide vane 144 is very high, which leads to a very large flow separation. The extent of this separation may be reduced by reducing the incidence of the rotor 132 exit flow onto the guide vanes 140,142 downstream. Accordingly it is beneficial to increase the rotor blade 132 turning angle by a few degrees, 3-5 degrees for example, beyond that strictly required at the design point (up to a maximum of 70 degrees total turning) so that an angled flow is delivered from the rotor 132. This reduces the angle of incidence of the flow from the rotor 132 on the vanes 144 downstream of the rotor 132. Accordingly the rotor blade 136 preferably has a higher turning angle than would conventionally be used. While this results in a slight reduction in rotor 132 performance it is more than compensated for by the reduction in losses due to slightly better flow alignment with the guide vanes 140,142.

In order to maximise efficiency, for the turbine to extract as much work as possible from the air flow passing through it, it is desirable to have a low swirl outlet flow from the turbine assembly 120. This means that is desirable to have a relatively highly loaded rotor profile, which leads to relatively large guide vane 144 and rotor blade 136 turning angles, typically greater than 55 degrees. Given this, and the fact that the guide vane 144 turning angles may be reduced (as described above) by the use of offset ducts 146 of varying height Hd, the guide vane 144 turning angles θ will typically be in the range 35-70 degrees, and a similar rotor blade 136 turning angle α in the range 35-70 degrees, giving an overall rotor blade 136 turning angle of between 70-140 degrees (i.e 2α) since the rotor is symmetrical about its axial mid plane.

In other words, the rotor 132, and in particular the turning angle α of the rotor blade 136 is designed to produce a non-axial outlet flow, and to have (at the design operating point) a circumferential swirl component to reduce the misalignment in the outlet flow with the vane profile facing the adjacent rotor 132. This can be contrasted with typical impulse turbine rotor designs which are designed to have a pulley axial flow at the design operating point. Accordingly the rotor 132, and rotor blade profile and in particular turning angle are configured so as to be more highly loaded, and have a higher mass flow rate than would be the case for a typical pure impulse turbine. The rotor 132 therefore in accordance with the invention is not a pure impulse type profile but has a slight pressure drop across the rotor 132 so as to produce a non axial outlet flow. While this reduces the efficiency of the rotor 132, it is compensated by a reduction in losses associated with the outflow misalignment with the guide vane 144, since the non axial outlet flow is not mis-aligned with the vane profile, and gives an overall improvement in overall efficiency. Indeed the rotor design (and turning angle) is preferably optimised and set so that, at the design flow rate, the degree of swirl and circumferential velocity component is such that the losses associated with the rotor outlet due to the outlet flow having such a swirl component are equal to the reduction in losses associated with the flow over the guide vane 144 due to the outlet flow having a swirl component and being at an angle rather than being axial.

Figure 10:
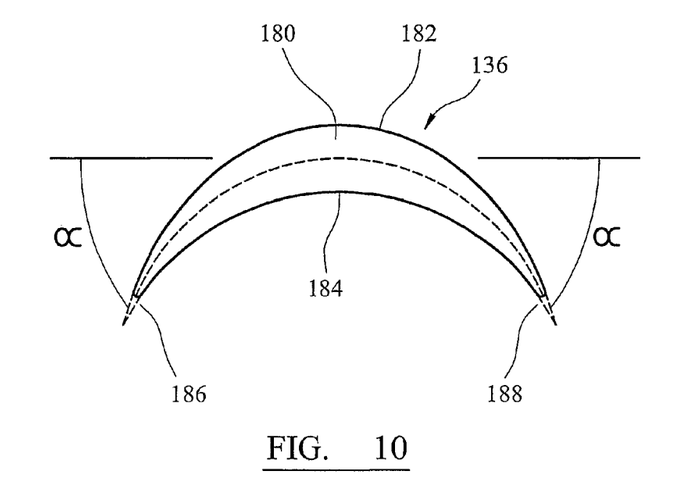
FIG. 10 is a schematic cross section of a rotor blade profile of the impulse turbine arrangement shown in FIG. 4.

The rotor blade profile of an embodiment of the invention is shown in FIG. 10, and is defined by a circular arc camber line 180 and a thickness. The rotor blade 136 is preferably symmetrical over its entire radial height about its mid line. The circular arc 180 defines the turning angle α of the rotor blade 136. It will be noted that the overall turning angle of the rotor blade 136 is in fact 2 times α since the blade profile is symmetrical. Pressure and suction surfaces 182,184 are then defined by parabolic curves through leading 186 and trailing 188 edge points, and the points of maximum thickness at mid-chord. The profile definition is completed by applying specified radii (which will depend upon manufacturing considerations) to the leading and trailing edges 186,188.

Figure 8:
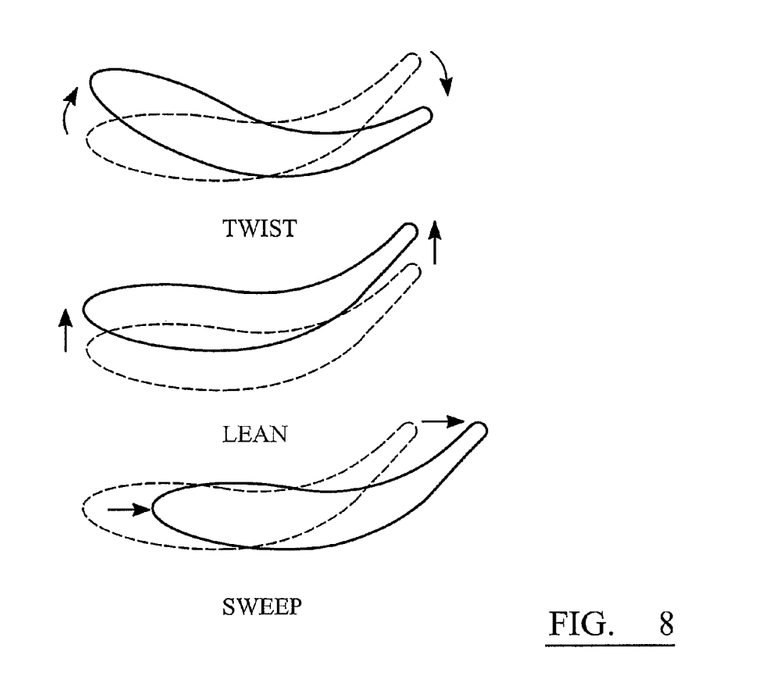
FIG. 8 is a series of cross sectional profiles through a vane illustrating vane section twist, lean and sweep which may be incorporated into the guide vane profiles of the impulse turbine arrangement shown in FIG. 4.

In addition to the use of a novel profile, the performance of the nozzle guide vane 144 and/or rotor blades 136 may be improved by making them 3-dimensional so as to better match them to the local flow conditions which change with radius. This means that whilst the profiles of the nozzle/guide vane blades are kept the same along their span the sections comprising the vane/blade at different radii are twisted, and circumferential and axial displacements (lean and sweep) are introduced by rotating the sections and stacking their centroids on a 3-dimensional mathematical function, rather than stacking their centroids along a straight radial line. This use of such 3-dimensional blade aerodynamic design optimisation of the guide vane and rotor blade profiles is particularly beneficial in situations where the characteristics of the forward and reverse flows are different, due for example to the difference in density between the air flow from the chamber 114 and from the atmosphere into the chamber 114. The twist, lean, and sweep which may be applied to a section is illustrated shown in FIG. 8. In addition the profiles of the vanes 144 and rotor blades 136 may also vary over their radial height and span.

It is known that flow separation can be reduced, or even prevented, by the introduction of fluid through the surface in question to re-energise the boundary layer through boundary layer blowing, and yield a net increase in performance. The fluid mass flow rate required to do this is typically relatively small compared to the total mass flow rate through the turbine.

Figure 9:
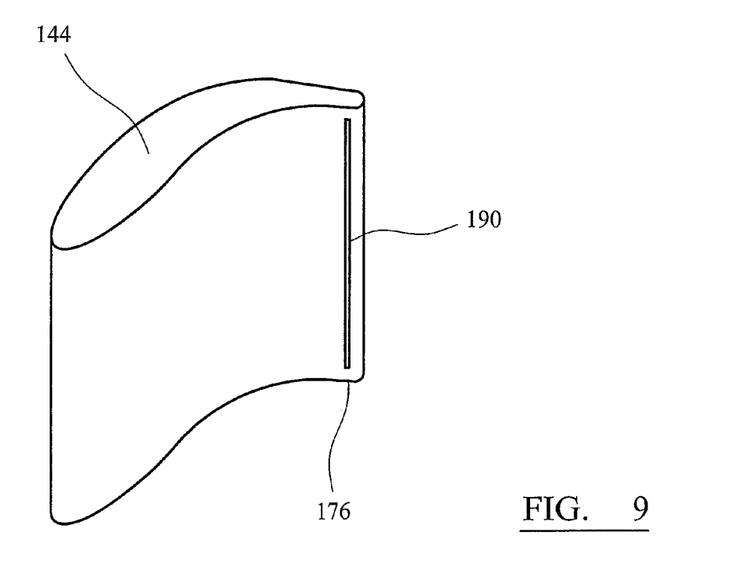
FIG. 9 is a schematic perspective illustration of a guide vane profile of the impulse turbine arrangement showing an angled slot in its surface to facilitate boundary layer blowing which may be incorporated into the guide vane profiles of the impulse turbine arrangement shown in FIG. 4.

Accordingly a re-energising flow of fluid may be directed over the nozzle guide vanes 144 when the nozzle guide vane 144 is downstream of the rotor 132 to re-energise the boundary layer over the nozzle guide vane 144 and control and reduce the flow separation that occurs during reverse flow over the nozzle guide vane 144 when the nozzle guide vane 144 is downstream of the rotor 132. As shown in FIG. 9, this may be achieved by providing a thin slot 190 close to the trailing edge 176 of the vane 144, from which a jet of fluid may be expelled when the vane 144 is subject to a reverse flow, and the flow is such that the vane 144 is downstream of the rotor 132. The slot 190 is arranged at an angle, typically of around 45 degrees, to the tangent to the local surface slope. To achieve greatest effect the slot 190 typically lies on the trailing edge 176 (which in the reverse flow becomes a leading edge) and the flow separation point when the vane 144 is acting as the downstream guide vane 144. To accommodate the slot 190 and suitable ducting within the vane 144 to supply fluid to the slot 190, the trailing edge 176 is made relatively thick. To be effective the velocity of the fluid flow from the slot must be higher than the local free stream velocity over the vane, and typically in the range of 1.1 to 1.3 times the free stream velocity.

Figure 14:
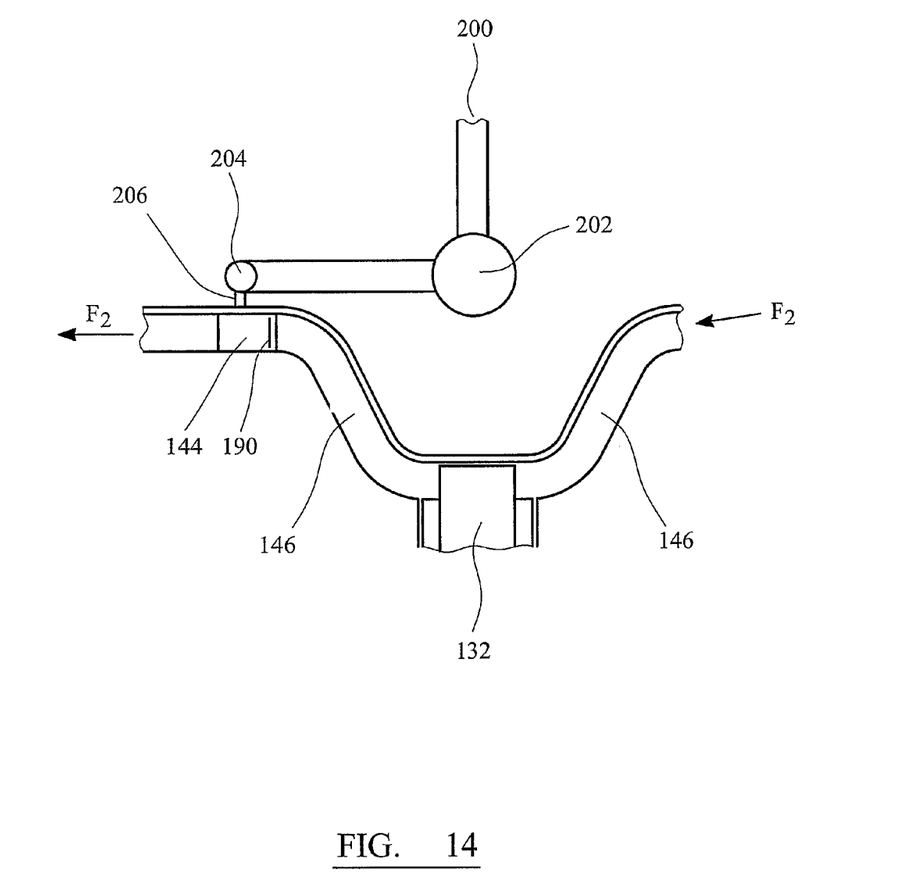
FIG. 14 is a schematic half cross sectional view through an impulse turbine arrangement similar to that of FIG. 11, but including yet another alternative arrangement to provide boundary layer blowing on the nozzle/guide vane blades with a switch controlling fluid supply from an external source.

The fluid flow required to produce the boundary layer control may be provided by any suitable means. For example, and as shown in FIG. 14, the fluid may be supplied from a separate source of pressurised air 200 via a suitable valve 202 a plenum and manifold 204 around the set of nozzle guide vanes from which it would be piped via a plurality of supply ducts 206 into the individual vane 144 and the slots 190 of each vane. The source of pressurised fluid is preferably at a pressure sufficient to provide a fluid flow from the slot 190 of the required velocity, typically of 1.1 to 1.3 times the free stream velocity, and so is determined by the area of the slot, and must be greater than the static pressure at the vane 144. The switching valve 202 is controlled such that it only supplies the blowing fluid to the slots 190 when there is the reverse flow (F2 in the case of the first set of guide vanes 140) through the turbine assembly 120 and over the respective vanes 144. It will be appreciated that in FIG. 14 only the blowing fluid supply arrangement for the first set of nozzle guide vanes 140 is shown, and that a corresponding fluid supply arrangement is provided for the second set of nozzle guide vanes 142.

Figure 11:
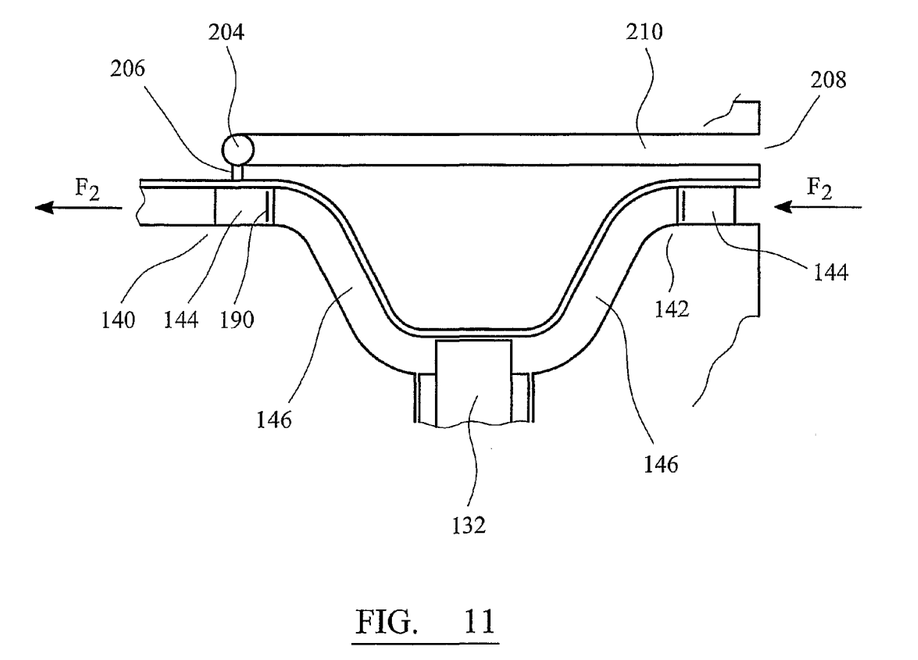
FIG. 11 is a schematic half cross sectional view through an impulse turbine arrangement similar to that of FIGS. 3 and 4, but including an arrangement to provide fluid for boundary layer blowing on the nozzle/guide vane blades by taking it from the driving flow sources.

Alternatively if the pressure drop across the turbine is sufficiently large, this may be used to provide the blowing fluid by delivering fluid from ahead of the upstream guide vanes 142 to the downstream ones either by taking additional flows from the flow sources, or by incorporating an intake (such as a simple Pitot type for example) in the flow annulus to bleed off the required blowing flow. Advantageously in such an arrangement a pressure difference which would give rise to an appropriate blowing flow would only exist when there is the appropriate flow F1,F2 through the turbine 120. In addition, when the main flow F,F1,F2 reverses a reverse blowing flow into the slot 190 and out of the intake does not occur, since the slot 190 is on the edge of the vane 144 adjacent the rotor 132, and so trailing edge, and the pressure at the trailing edge, and slot 190 is similar as the downstream pressure at the opposite side of the opposite vane, with the main pressure drop of an impulse turbine occurring over the inlet/upstream guide vane. Accordingly such a passive blowing arrangement automatically only supplies blowing fluid to the appropriate guide vane for the current direction of main the flow F1,F2 without the need for any switching arrangement 202. This would advantageously create a passive blowing system with no moving parts. Such passive blowing arrangements are shown in FIGS. 11 and 12.

In the blowing arrangement of FIG. lithe additional fluid flow for the first set of vanes 140 is taken from the atmosphere via a secondary inlet 208 and duct 210 to transfer fluid to the plenum 204 around the first set of nozzle guide vanes 140, from which it is piped 206 into the individual vanes 144 and slots 190. The blowing arrangement for the second set of vanes 142 is not shown in FIG. 11, but is similar although in that case the additional fluid flow is taken from the chamber 114 of the oscillating water column electrical generator 110.

Figure 12:
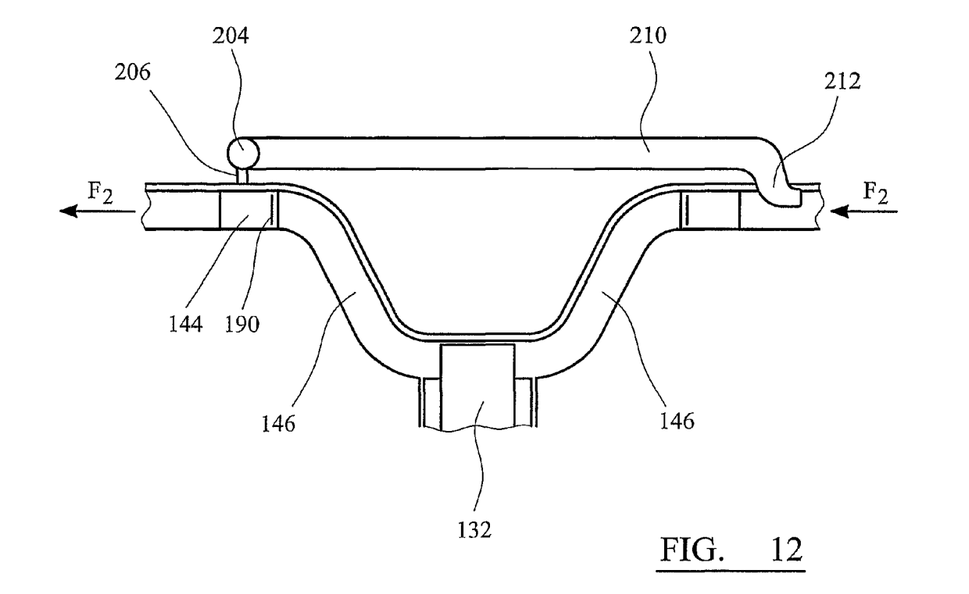
FIG. 12 is a schematic half cross sectional view through an impulse turbine arrangement similar to that of FIG. 11, but including an alternative arrangement to provide fluid for boundary layer blowing on the nozzle/guide vane blades by using intakes in the flow annulus.

In the blowing arrangement of FIG. 12, which is the preferred arrangement, to provide the fluid to the first set of vanes 140 when operating in a reverse flow F2, a Pitot type intake 212 is disposed in the flow passage ahead of second set of nozzle guide vanes 142. This is connected to a duct 210 to transfer fluid around the second set of nozzle guide vanes 142, downstream of the second set of nozzle guide vanes 142, and to the other side of the rotor 132 and to the plenum 204 from which it is piped 206 into the individual vanes 144 and slots 190 of the first set of vanes 140. The blowing arrangement for the second set of vanes 142, is not shown in FIG. 12, but is similar although in that case the additional fluid flow is taken from a Pitot type intake disposed in the flow passage ahead of first set of nozzle guide vanes 140. This is connected to a duct to transfer fluid around the first set of nozzle guide vanes 140 and downstream of the first set of nozzle guide vanes 140 to the other side of the rotor 132 to the plenum 204 from which it is piped 206 into the individual vanes 144 and slots 190 of the second set of nozzle guide vanes 142.

Figure 13:
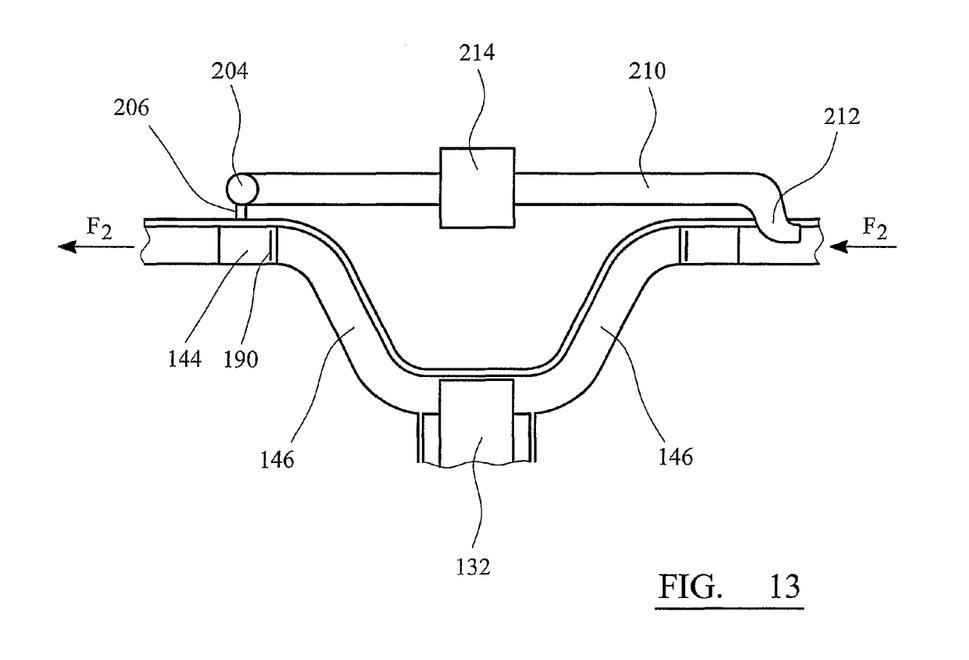
FIG. 13 is a schematic half cross sectional view through an impulse turbine arrangement similar to that of FIG. 11, but including a yet further alternative arrangement to provide boundary layer blowing on the nozzle/guide vane blades with a boost compressor.

If the pressure difference in a particular application is too small to pump the required mass flow rate of blowing air, a small compressor 214 could be incorporated into the system, as shown in FIG. 13 to either boost the pressure of the diverted air. Such a pump 214 could similarly be incorporated in the arrangement of FIG. 11. The use of such a pump 214 is though less desirable since it adds complexity and also requires a switching system to appropriately operate the pump 214.

It will also be appreciated that the slots 190 could be replaced in other embodiments by a series of small holes or multiple slots to provide multiple spaced jets of blowing fluid over the vanes. This may reduce the blowing fluid requirements and/or increase the effectiveness that could be achieved for a given blowing flow rate.

The invention as described consists of a novel impulse turbine arrangement, which provides a solution to the above problem of low overall efficiency when the flow through an impulse turbine periodically reverses, and a turbine 120 in accordance with a particular embodiment of the invention may provide an improved efficiency of 75% or more. As a result such an impulse turbine arrangement of the invention can be practically and advantageously used for example in an oscillating water column power generation system. The impulse turbine arrangement also has further advantages over other, for example Wells type turbine arrangements conventionally used in such an application, including having a relatively slow operational rotational speed, higher torque characteristics as compared to for example a similar duty Wells turbine, and no (or low) axial operational loads. The impulse turbine arrangements of the preferred embodiments also has a fixed geometry and only the one main moving part—the rotor.

While as described the impulse turbine arrangement 120 is particularly suitable for use with an oscillating water column generating unit 110, it may be used and used in other applications in which a flow through an impulse turbine arrangement 120 periodically reverses.

It will also be appreciated that the precise geometry of the turbine arrangement 120, and in particular the exact profile and dimensions of the vanes 144 and blade 136 will be determined by the details of the specific application, and so they have been described herein with reference to typical values of the important parameters. Furthermore, although the description only refers to the use of single row and set of nozzle guide vanes 140,142 either side of a rotor 132 with a single blade row, these might very well be replaced by multiple blade rows and rows of guide vanes.

The principle and mode of operation of this invention have been explained and illustrated in its preferred embodiment. However, it must be understood that this invention may be practised otherwise than as specifically explained and illustrated without departing from its spirit or scope.

We claim:

1. A bi-directional flow impulse type turbine arrangement for use with a bi-directional reversing flow through the turbine arrangement, the turbine arrangement having an axis and comprising:
   a rotor rotatably mounted to rotate about the axis and having a plurality of rotor blades disposed circumferentially around the rotor,
   a first set of guide vanes circumferentially disposed about the axis for directing the bi-directional reversing flow to and from the rotor blades via a first flow passage defined by a first duct; and
   a second set of guide vanes axially spaced from the first set of guide vanes and circumferentially disposed about the axis for directing the bi-directional reversing flow to and from the rotor blades via a second flow passage defined by a second duct,
   wherein the first and second sets of guide vanes are disposed at a greater radius than the rotor blades, such that an entirety of each of the first and second sets of guide vanes is disposed radially outward from each blade tip of the rotor blades.

2. The turbine arrangement of claim 1, wherein the height of the first and second flow passages is constant along the length of the respective first and second ducts.

3. An oscillating water column power generator comprising:
   a housing defining a chamber for a fluid which is periodically compressed and expanded by the oscillating water column, the housing having an outlet for directing a bi-directional reversing flow of the fluid periodically compressed and expanded by the oscillating water column from the housing;
   a turbine arrangement of any preceding claim connected to the outlet and driven by the bi-directional reversing flow of the fluid from the outlet; and
   a generator connected to and driven by the rotor of the turbine arrangement.

* * * * *